United States Patent
Lee et al.

(10) Patent No.: US 8,407,483 B2
(45) Date of Patent: Mar. 26, 2013

(54) APPARATUS AND METHOD FOR AUTHENTICATING PERSONAL USE OF CONTENTS BY USING PORTABLE STORAGE

(75) Inventors: Jooyoung Lee, Seoul (KR); Hyon-Gon Choo, Daejon (KR); Jeho Nam, Seoul (KR); Jin-Woo Hong, Daejon (KR); Moon-Kyun Oh, Daejon (KR); Sang-Kwon Shin, Daejon (KR); Won-Sik Cheong, Daejon (KR); Sangwoo Ahn, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 488 days.

(21) Appl. No.: 12/626,770

(22) Filed: Nov. 27, 2009

(65) Prior Publication Data

US 2010/0161997 A1    Jun. 24, 2010

(30) Foreign Application Priority Data

Dec. 18, 2008 (KR) .................. 10-2008-0129444
Apr. 10, 2009 (KR) .................. 10-2009-0031522

(51) Int. Cl.
 G06F 12/14 (2006.01)
 G06F 21/00 (2006.01)
 H04L 9/00 (2006.01)
 H04L 29/06 (2006.01)

(52) U.S. Cl. ........ 713/189; 713/182; 713/168; 713/175; 726/4; 726/26; 726/28

(58) Field of Classification Search .................. None
 See application file for complete search history.

(56) References Cited

U.S. PATENT DOCUMENTS

| 7,756,792 | B2 * | 7/2010 | Hughes ............................ 705/57 |
| 7,770,226 | B2 * | 8/2010 | Ahn ................................. 726/26 |
| 2002/0099665 | A1 * | 7/2002 | Burger et al. .................... 705/67 |
| 2003/0018491 | A1 * | 1/2003 | Nakahara et al. ................. 705/1 |
| 2003/0145211 | A1 * | 7/2003 | Fukawa .......................... 713/182 |
| 2004/0250077 | A1 * | 12/2004 | Jang et al. ..................... 713/175 |
| 2005/0091507 | A1 * | 4/2005 | Lee et al. ...................... 713/182 |
| 2005/0210236 | A1 * | 9/2005 | Lee et al. ...................... 713/153 |
| 2006/0174349 | A1 * | 8/2006 | Cronce et al. ................... 726/26 |

(Continued)

FOREIGN PATENT DOCUMENTS

KR          20040104778 A    12/2004
KR       1020060105362 A    10/2006

(Continued)

OTHER PUBLICATIONS

Jooyoung Lee, et al; "A Study on Authentication of Person—usage Using a Secure Portable Storage", Broadcasting & Telecommunications Media Research Department, ETRI Nov. 29, 2008; 3 pages; (Jooyoung Lee, Hyon-Gon Choo, and Jeho Nam are inventors of patent application U.S. Appl. No. 12/626,770).

*Primary Examiner* — Philip Chea
*Assistant Examiner* — Dorianne Alvarado David
(74) *Attorney, Agent, or Firm* — Ladas & Parry LLP (57) ABSTRACT

A system for authenticating personal use of contents by using a portable storage medium includes: a portable personal use authentication device configured to store domain authentication information; and a contents personal use authentication apparatus configured to extract playback information for playing a provided content based on the domain authentication information and provide the extracted playback information to a player.

11 Claims, 5 Drawing Sheets

U.S. PATENT DOCUMENTS

| | | | |
|---|---|---|---|
| 2006/0190621 A1* | 8/2006 | Kamperman et al. | 709/245 |
| 2007/0226811 A1 | 9/2007 | Kamperman et al. | |
| 2008/0082813 A1* | 4/2008 | Chow et al. | 713/2 |
| 2008/0098471 A1* | 4/2008 | Ooi et al. | 726/9 |
| 2008/0244706 A1* | 10/2008 | Lenoir et al. | 726/4 |
| 2008/0313741 A1* | 12/2008 | Alve et al. | 726/26 |
| 2009/0132811 A1* | 5/2009 | Koster et al. | 713/156 |
| 2009/0217036 A1* | 8/2009 | Irwin et al. | 713/168 |
| 2010/0024039 A1* | 1/2010 | Reuzel | 726/26 |

FOREIGN PATENT DOCUMENTS

| | | |
|---|---|---|
| KR | 1020060105934 A | 10/2006 |
| KR | 1020070012491 A | 1/2007 |
| KR | 1020080026022 A | 3/2008 |

* cited by examiner

APPARATUS AND METHOD FOR AUTHENTICATING PERSONAL USE OF CONTENTS BY USING PORTABLE STORAGE

CROSS-REFERENCES TO RELATED APPLICATIONS

The present invention claims priority of Korean Patent Application Nos. 10-2008-0129444 and 10-2009-0031522, filed on Dec. 18, 2008 and Apr. 10, 2009, respectively, which are incorporated herein by reference.

BACKGROUND OF THE INVENTION

1. Field of the Invention

The present invention relates to an apparatus and method for authenticating personal use of a contents; and, more particularly, to a contents personal use authentication apparatus and method using a portable storage medium.

2. Description of Related Art

Digital contents are easily and quickly copied, and the copied one maintains the same quality as the original one. Accordingly, it can be readily distributed through a wired or wireless electric communication network. This causes digital contents to be illegally copied and distributed without going through a lawful distribution process. To cope with this problem, Digital Rights Management (DRM) technology was suggested to protect digital contents from being copied and distributed without permission and lawfully distribute the digital contents through user authorization and charging procedure.

In the initial days, the DRM technology prevented the illegal copying of digital contents on a single device basis. Thus, although a user (who will be referred to as an eligible user, hereafter) receives a digital content through a lawful distribution path, the user can use the digital content only in the terminal used for receiving the digital content. In other words, the user cannot use the digital content in other devices that the user owns. Here, a problem that the personal use right by a lawful user is infringed.

To protect the right of a user personally using a digital content, conventional technology called domain technology was suggested. Domain technology allows an eligible user to bind a plurality of devices owned by the eligible user into one group and freely copy and share digital contents among the devices of the group. Researchers are now studying to advance the domain technology.

The domain technology has two ways of registering devices. First, a domain management server existing outside a domain issues domain membership authority to a plurality of devices included in the domain. Second, some devices belonging to the domain issue domain membership authority to the other devices. The latter method is more appropriate in view of securing personal use than the former method because the domain is formed directly by a device owned by a user.

As described above, general domain technologies limit the scope of personal use to devices registered in a domain. Therefore, when an eligible user acquires a new device and the new device is not registered yet or cannot be registered due to its own characteristics, the user cannot copy a digital content into the new device or even if a digital content is copied into the new device, the new device cannot play the digital content. In short, the simple domain technology based on registration method limit the use scope of contents and it cannot achieve personal use in its exact meaning. Since this makes eligible users inconvenient, a user authentication method needs to be applied to the domain technology so that the personal use in its exact meaning should be achieved.

Typical user authentication method largely includes information a user knows, i.e., 'what you know', information unique to the user, i.e., 'who you are', and information the user has, i.e., 'what you have'. Herein, the information the user knows, e.g., ID and password, may be given to other users for an illegal purpose. Also, realizing a system using the information unique to the user, e.g., fingerprints and eye iris, has a problem of high cost. Therefore, it is required to develop a method and apparatus that can support a user authentication based on information a user has.

SUMMARY OF THE INVENTION

An embodiment of the present invention is directed to provide a personal use system and method that can secure personal use of contents based on information a user has.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a system for authenticating personal use of contents, including: a contents personal use authentication apparatus having: a packager configured to depackage contents into a package key, a package key information, and an encrypted content; an access controller configured to read domain authentication information from a portable personal use authentication device storing the domain authentication information, and to extract domain information based on the package key information and playback information of a content based on the package key and the domain authentication information and; and a controller configured to receive the encrypted content from the packager and the playback information from the access controller, and send the encrypted content and the playback information to a player.

In accordance with another aspect of the present invention, there is provided a method for authenticating personal use of contents, including: reading domain authentication information from a portable personal use authentication device storing the domain authentication information; extracting playback information of a content provided to a contents personal use authentication apparatus by using the domain authentication information; and providing the playback information extracted in the contents personal use authentication apparatus to a player.

DESCRIPTION OF SPECIFIC EMBODIMENTS

The advantages, features and aspects of the invention will become apparent from the following description of the embodiments with reference to the accompanying drawings, which is set forth hereinafter. The terms mentioned hereafter are used to help understanding the scope of the present invention, and different terms may be used for the same meaning according to a different manufacturer or research group. Hereafter, the method and apparatus of the present invention will be described in detail with reference to the accompanying drawings.

Figure 1:
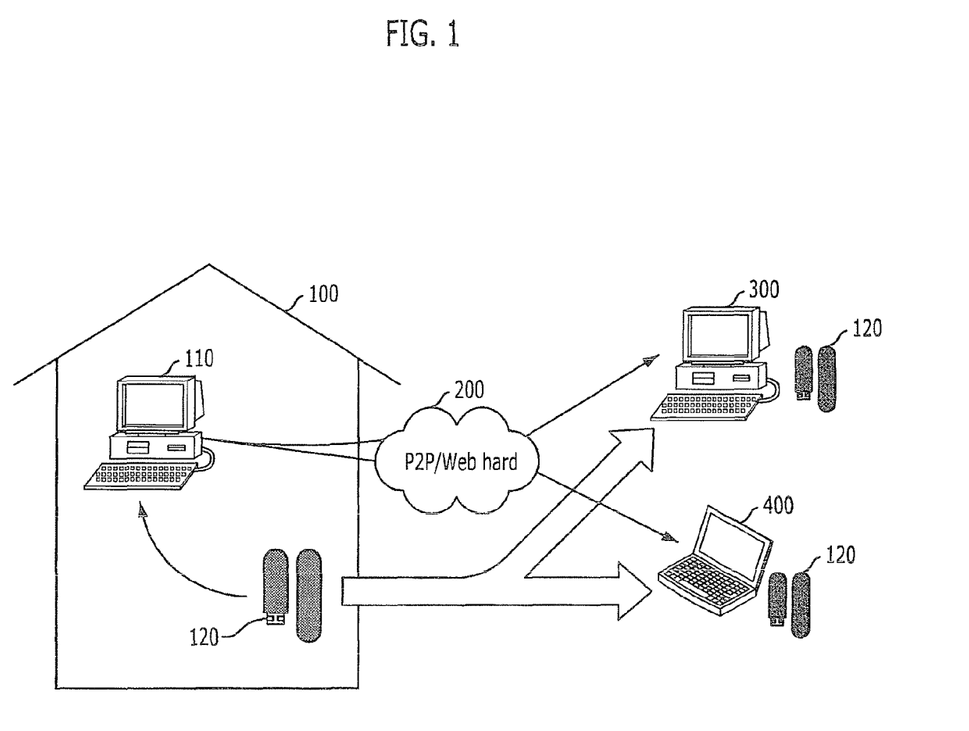
FIG. 1 illustrates a contents personal use authentication method for authenticating a personal use of contents in a portable storage medium in accordance with an embodiment of the present invention.

FIG. 1 illustrates a contents personal use authentication method for authenticating a personal use of contents in a portable storage medium in accordance with an embodiment of the present invention.

Referring to FIG. 1, the contents personal use authentication method using a portable storage medium includes: a process that a domain management device 110 registers a portable personal use authentication device 120 in a domain, a process that the domain management device 110 provides contents to external devices 300 and 400 which are not registered in the domain through a storage medium or the Internet 200, and a process that the contents provided to the external devices 300 and 400 are played when the portable personal use authentication device 120 is connected to the external devices 300 and 400. These processes will be described in detail hereafter.

Before the description of the processes, as illustrated in FIG. 1, it is assumed that the domain management device 110 and the portable personal use authentication device 120 are registered in the same domain 100. The domain 100 may include devices other than the domain management device 110 and the portable personal use authentication device 120.

When a user connects the portable personal use authentication device 120 to the domain management device 110 which issues a domain membership authority and makes a command to register the portable personal use authentication device 120 in the domain 100, the domain management device 110 sends a domain key to the portable personal use authentication device 120, and the portable personal use authentication device 120 stores the domain key inside in the form of protected domain key. Then, when the user downloads a content which belong to the domain 100 from a storage medium, such as a Universal Serial Bus (USB) memory or flash memory, or the Internet 200, such as web hard or P2P, to the external devices 300 and 400 and attempts to use the downloaded content, the external devices 300 and 400 cannot play and use the content. This is because the external devices 300 and 400 are not registered in the domain 100. Here, if the user connects the portable personal use authentication device 120 to the external devices 300 and 400, the external devices 300 and 400 acquire the domain key for the content from the portable personal use authentication device 120 and play the content based on the acquired domain key.

The contents personal use authentication method using a portable personal use authentication device allows a user to use a content in a device not registered in the domain 100, which is an advance from the conventional method where personal use authentication is performed only for the devices registered to the domain 100 or devices physically connected to the devices registered to the domain 100. Hereafter, an apparatus for realizing the contents personal use authentication method in accordance with the embodiment of the present invention and a method for operating the apparatus will be described with reference to the accompanying drawings.

Figure 2:
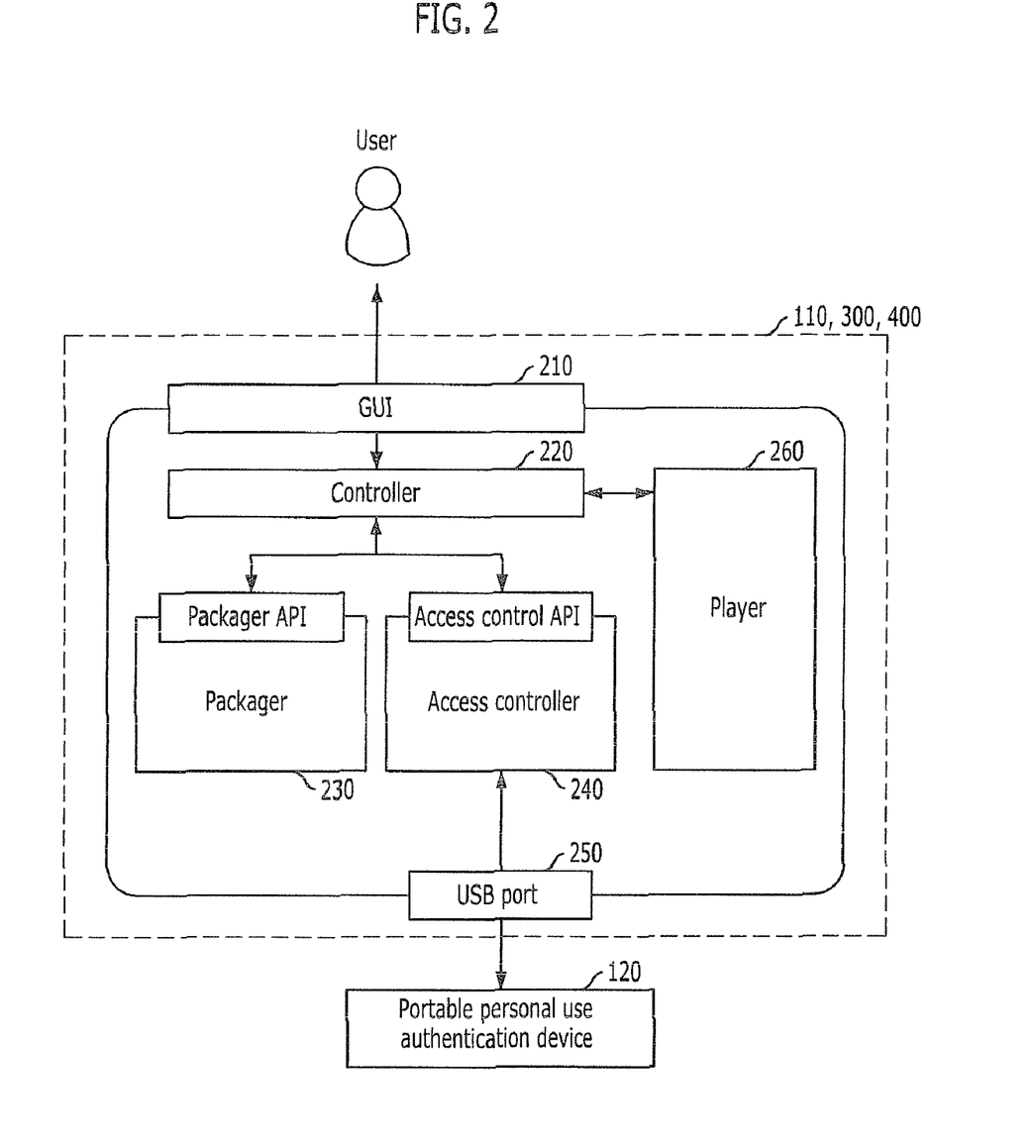
FIG. 2 is a block diagram illustrating a contents personal use authentication apparatus in accordance with an embodiment of the present invention.

FIG. 2 is a block diagram illustrating a contents personal use authentication apparatus in accordance with an embodiment of the present invention.

Referring to FIG. 2, both internal and external devices 110, 300 and 400 include the contents personal use authentication apparatus, individually in accordance with the embodiment of the present invention. However, the present invention is not limited to this embodiment and the contents personal use authentication may be formed as a separate apparatus. Hereafter, the contents personal use authentication apparatus will be described in detail.

The contents personal use authentication apparatus shown in FIG. 2 includes a graphical user interface (GUI) 210, a controller 220, a packager 230, an access controller 240, a USB port 250, and a player 260.

The GUI 210 is an interface between a computer and a user, which is devised to link graphical elements such as an object, a frame, and color on a screen to certain functions and purposes when the user uses the computer. Most modern operating systems including Windows, Linux, Mc OS 10 support the graphic user interface. Operating systems based on Linux and Unix generally use an X window system and they may be extended into Motif, Qt, GTK+ and so forth.

The controller 220 receives a control signal corresponding to a user command through the GUI 210 and controls the operations of the packager 230, the access controller 240, and the player 260 according to the control signal.

Also, the controller 220 receives a package key, package key information, and an encrypted content from the packager 230, and transmits the package key and the package key information among the provided informations to the access controller 240. Here, the package key is a key obtained by encrypting playback information of a specific content, e.g., content descrambling key, into a domain key and the package key provides a security of allowing only a subject possessing the domain key to use the content. The package key information is side information for the package key and it includes such information as which domain the package key belongs to, the encryption algorithm of the package key, and length of the package key.

Also, the controller 220 receives the playback information from the access controller 240 and provides the playback information and the encrypted content received from the packager 230 to the player 260.

The controller 220 may also provide a function of registering or canceling a portable personal use authentication device 120, which is connected to the contents personal use authentication apparatus, through the USB port 250 upon receipt of a command from the user. Here, the portable personal use authentication device 120 will be described in detail by referring to the accompanying drawing.

Figure 3:
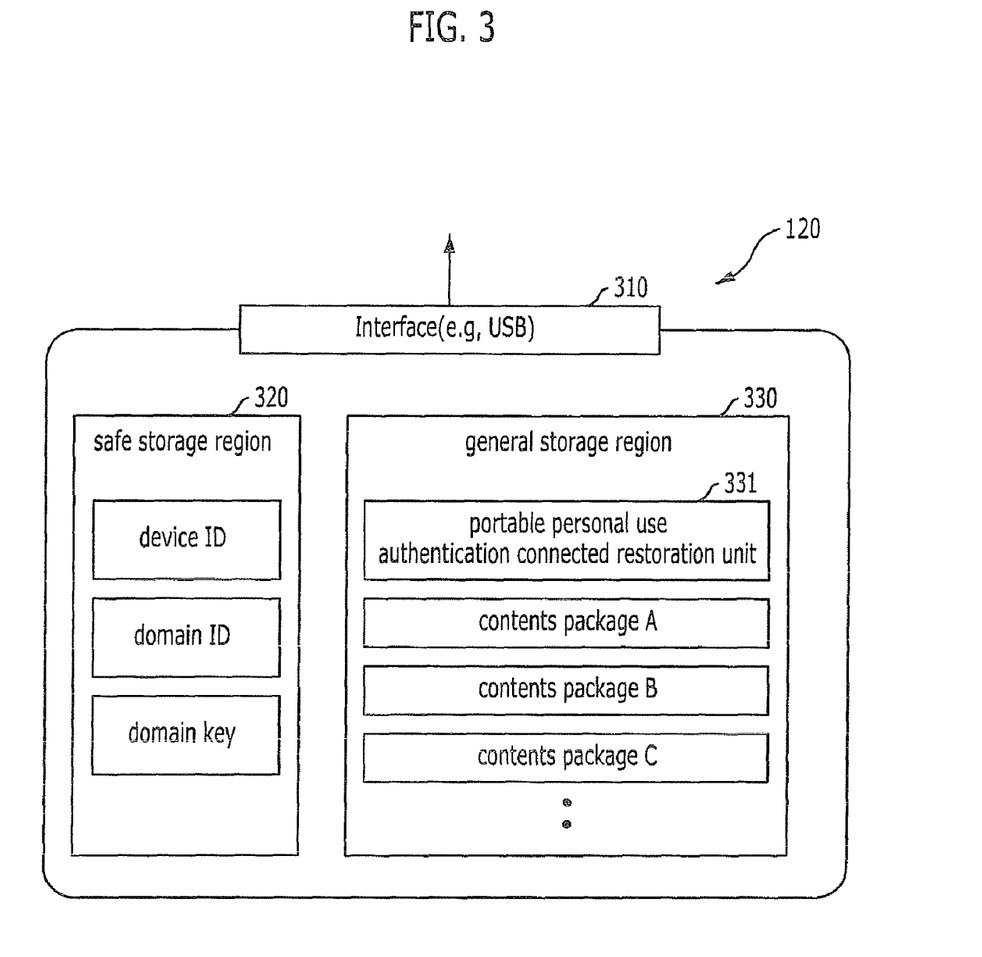
FIG. 3 is a block diagram showing a portable personal use authentication device in accordance with an embodiment of the present invention.

FIG. 3 is a block diagram showing the portable personal use authentication device 120 in accordance with an embodiment of the present invention.

Referring to FIG. 3, the portable personal use authentication device 120 includes a safe storage region 320 and a general storage region 330.

Data requiring security are stored in the safe storage region 320. Since the safe storage region 320 uses a storage scheme with a unique security technology, which is different from general file system architecture, it is inaccessible through the operating system of a user. An example of the unique security technology, which is different from general file system architecture, is to encrypt information stored in the safe storage region 320 by using a serial number concealed inside the portable personal use authentication device 120.

A user can access to the safe storage region 320 only through an authenticated application. In the embodiment of the present invention, the access controller 240 of the contents personal use authentication apparatus shown in FIG. 2 is used as an example of the authenticated application.

The safe storage region 320 stores device identification (ID) of the portable personal use authentication device 120, domain ID of the domain in which the portable personal use authentication device 120 is registered, and a domain key which is a domain registration authority. Information including the above three informations is referred to as domain authentication information. The domain authentication information is not duplicable. Even if it is duplicated, it cannot be interpreted.

The following Table 1 shows an example of the device ID, the domain ID, and the domain key stored in the safe storage region 320 of the portable personal use authentication device 120.

TABLE 1

| Management Information | Length (bit) | Number of Information | Meaning |
| --- | --- | --- | --- |
| Device ID | 128 | 1 | Device ID of portable personal use authentication device |
| Domain ID | 128 | 1 | Domain ID of a domain where portable personal use authentication device is registered |
| Domain key | 128 | 1 | Secret key issued from domain management device |

The general storage region 330 is accessible through a general file system. Here, the general file system means the operating system of the external devices 300 and 400. As an embodiment, the general storage region 330 includes a portable personal use authentication linked playback unit 331 for playing a protected content in the connected external devices 300 and 400. Also, contents packages A, B and C owned by the user and other diverse data may be stored in the general storage region 330.

Referring back to FIG. 2, the packager 230 operates according to a control signal from the controller 220 and it depackages a particular contents package indicated by the control signal from the controller 220 into a package key, package key information, and an encrypted content. The particular contents package may be downloaded from the Internet or a storage medium or received from the general storage region 330 of the portable personal use authentication device 120, which is illustrated in FIG. 1. The packager 230 transmits the depackaged informations, e.g., the package key, the package key information, and the encrypted content to the controller 220.

Conversely, the packager 230 may package the package key, the package key information, and the encrypted content into the contents package.

Hereafter, the access controller 240 will be described in detail with reference to the accompanying drawings.

Figure 4:
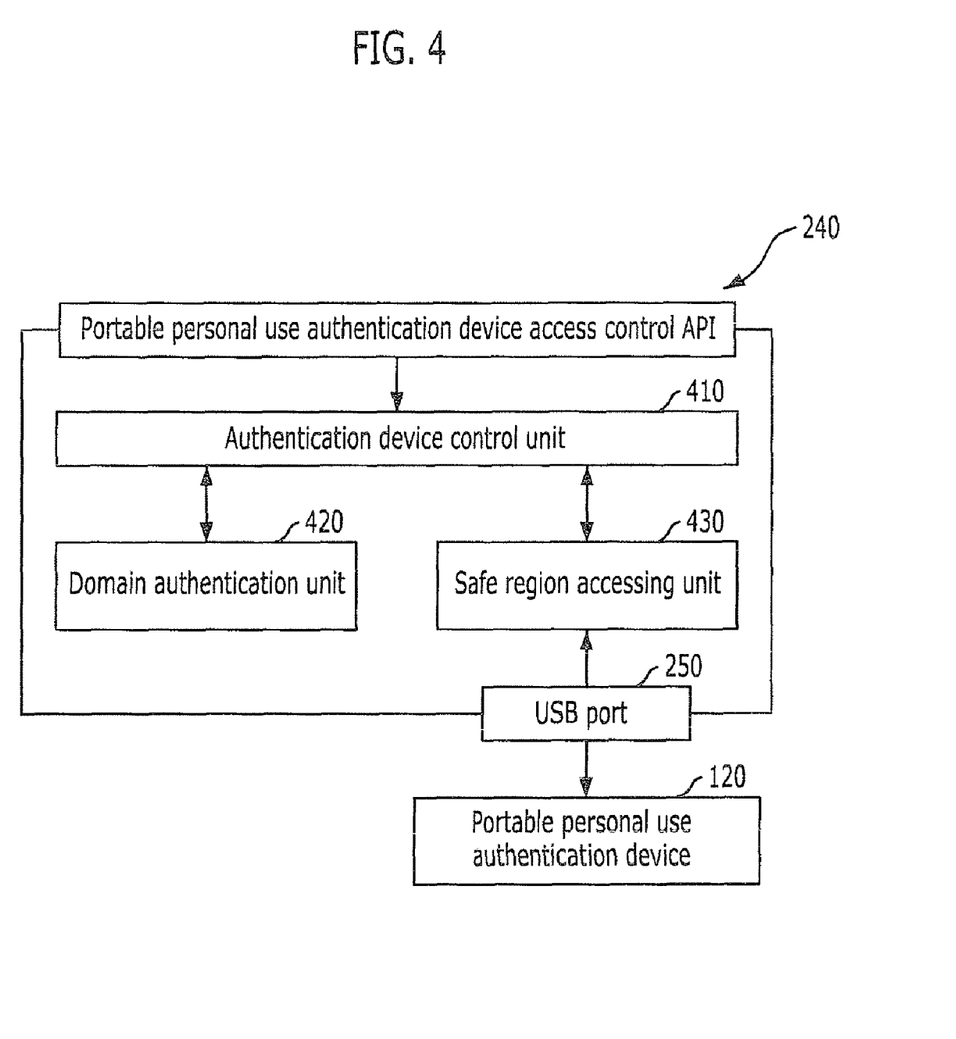
FIG. 4 is a block diagram illustrating an access controller of a contents personal use authentication apparatus in accordance with an embodiment of the present invention.

FIG. 4 is a block diagram illustrating an access controller of a contents personal use authentication apparatus in accordance with an embodiment of the present invention.

Referring to FIG. 4, the access controller 240 includes an authentication device control unit 410, a domain authentication unit 420, and a safe region accessing unit 430.

The authentication device control unit 410 receives the package key and the package key information from the packager 230 shown in FIG. 2 and transmits them to the domain authentication unit 420.

Also, the authentication device control unit 410 receives a domain ID from the domain authentication unit 420 and a domain ID from the portable personal use authentication device 120 through the safe region accessing unit 430. The authentication device control unit 410 compares the domain ID from the domain authentication unit 420 with the domain ID from the portable personal use authentication device 120 through the safe region accessing unit 430. When the two domain IDs are the same, the authentication device control unit 410 acquires a domain key from the portable personal use authentication device 120 through the safe region accessing unit 430 and provides the domain key to the domain authentication unit 420.

The authentication device control unit 410 also receives playback information from the safe region accessing unit 430 and provides it to the controller 220 shown in FIG. 2.

The domain authentication unit 420 operates according to the control signal from the authentication device control unit 410, and receives the package key and package key information from the authentication device control unit 410. The domain authentication unit 420 extracts the domain ID from the package key information and provides the extracted domain ID to the authentication device control unit 410.

When the domain authentication unit 420 receives the domain key provided by the authentication device control unit 410, it extracts playback information from the package key based on the domain key and provides the playback information to the authentication device control unit 410.

The safe region accessing unit 430 operates according to the control signal from the authentication device control unit 410 and reads in domain authentication information stored in the safe storage region of the portable personal use authentication device 120 through the USB port 250 by using a secured channel during the operation.

The safe region accessing unit 430 may monitor the connection with the portable personal use authentication device 120 and provide the monitoring result to the authentication device control unit 410.

Hereafter, the operation of the access controller 240 will be described.

When the authentication device control unit 410 receives the package key and the package key information from the packager 230 through the controller 220, it provides them to the domain authentication unit 420. The domain authentication unit 420 extracts the domain ID from the received package key information and provides the extracted domain ID to the authentication device control unit 410. The authentication device control unit 410 reads in the domain ID stored in the portable personal use authentication device 120 through the safe region accessing unit 430. The authentication device control unit 410 compares the domain ID acquired from the portable personal use authentication device 120 with the domain ID received from the domain authentication unit 420. When the two domain IDs turn out to be the same, the authentication device control unit 410 acquires the domain key from the portable personal use authentication device 120 through the safe region accessing unit 430 and provides the acquired domain key to the domain authentication unit 420. Then, the domain authentication unit 420 extracts playback information from the package key by using the received domain key, and provides the playback information to the authentication device control unit 410. The authentication device control unit 410 sends the playback information to the controller 220 shown in FIG. 2.

The access controller 240 may perform additional operations other than the above operation. Examples of the additional operations of the access controller 240 are presented in the following Table 2.

TABLE 2

Function of recognizing portable personal use authentication device

| | |
|---|---|
| Input | 128-bit device ID and 128-bit domain ID are received from currently connected portable personal use device(s). |
| Function | Currently connected portable personal use device(s) is recognized, and a list of device IDs and domain IDs provided for the recognition is generated. |
| Output | The list of device IDs and domain IDs of currently connected portable personal use device(s) is provided to the controller 220. |

Function of registering portable personal use authentication device

| | |
|---|---|
| Input | 128-bit device ID, 128-bit domain ID and 128-bit domain key of portable personal use authentication device to be registered in the domain are received from the controller 220. |
| Function | A function of registering the portable personal use authentication device not registered in the domain yet in the domain is provided. For the registration, the device ID, the domain ID, and the domain key provided from the controller 220 are transformed into secured forms, which is provided to the portable personal use authentication device to be registered in the domain. |
| Output | The access controller informs the controller 220 that the portable personal use authentication device is registered in the domain. |

Function of cancelling authority of the portable personal use authentication device

| | |
|---|---|
| Input | 128-bit device ID of portable personal use authentication device registered in the domain is received. |
| Function | A function of cancelling authority of the portable personal use authentication device registered in the domain is provided. For the cancellation, the device ID, the domain ID, and the domain key stored in the portable personal use authentication device registered in the domain are deleted. |
| Output | The access controller informs the controller 220 that the authority of the portable personal use authentication device is cancelled from the domain. |

Referring back to FIG. 2, the USB port 250 connects the portable personal use authentication device 120 to the contents personal use authentication apparatus according to the embodiment of the present invention. The connection between the portable personal use authentication device 120 and the contents personal use authentication apparatus according to the embodiment of the present invention may be achieved using a Bluetooth, which is capable of transmitting/receiving data to/from the portable personal use authentication device 120, other than the USB port 250 and wired/wireless connection methods capable of connecting devices in a local area, such as IEEE1394, may be used.

The player 260 receives the encrypted content and the playback information from the controller 220, decrypts the encrypted content based on the playback information, and plays the decrypted content.

Hereafter, the operation of the contents personal use authentication apparatus according to an embodiment of the present invention will be described with reference to the accompanying drawings.

Figure 5:
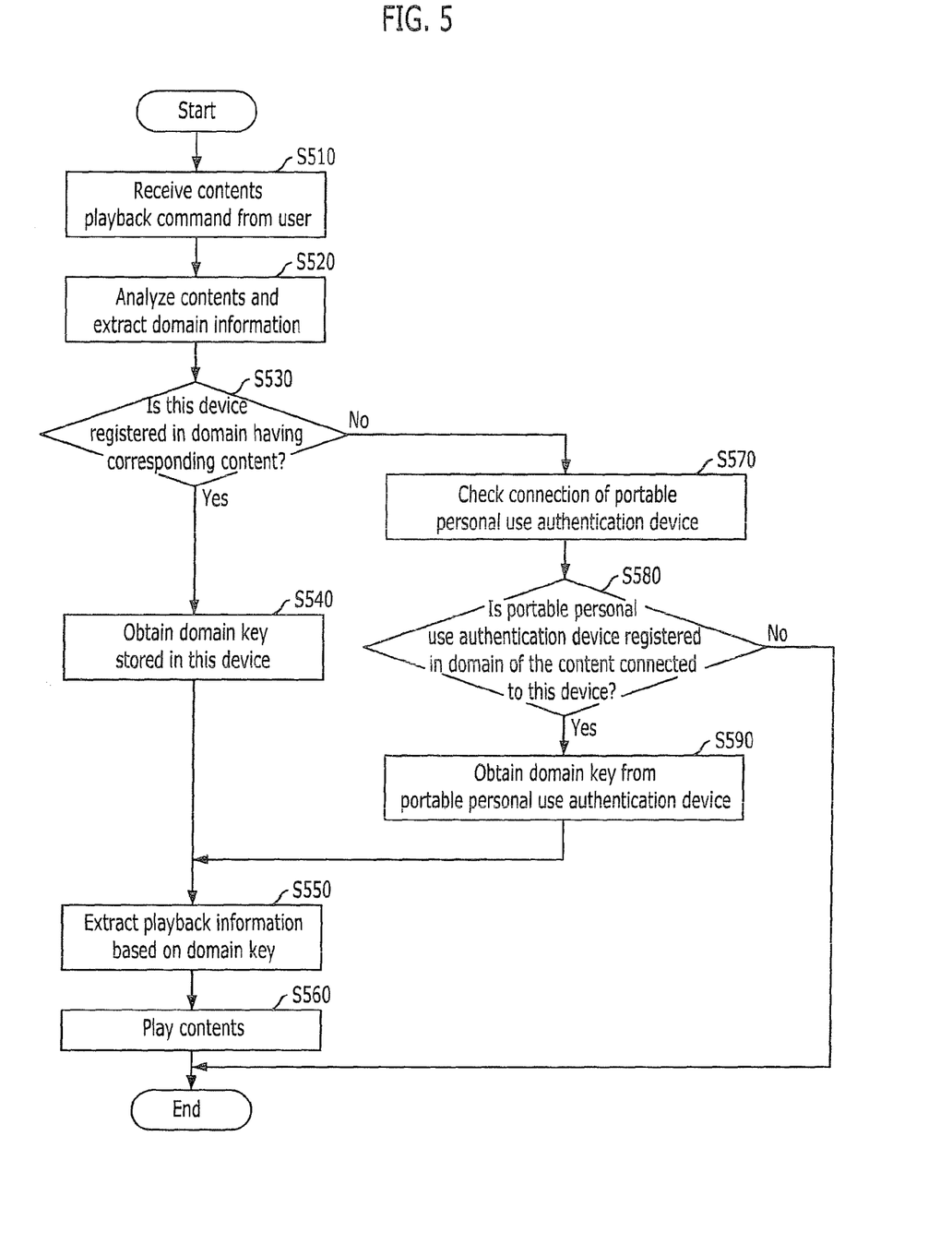
FIG. 5 is a flowchart describing a process of playing contents in a contents personal use authentication apparatus in accordance with an embodiment of the present invention.

FIG. 5 is a flowchart describing a process of playing contents in a contents personal use authentication apparatus in accordance with an embodiment of the present invention.

Referring to FIG. 5, at step S510, the controller 220 of the contents personal use authentication apparatus fabricated according to the embodiment of the present invention receives a command to play a specific content from a user through the GUI 210. The controller 220 transmits a control signal for operating the packager 230 to the packager 230.

At step S520, the packager 230 receives the control signal, analyzes to see if there exists a 'contents package' indicated by the control signal, and extracts the encrypted contents and domain information from the content package, e.g., the package key and the package key information, by depackaging the contents package. The packager 230 provides the package key, the package key information, and the encrypted content to the controller 220.

At step S530, the controller 220 determines whether the external device 300 including the contents personal use authentication apparatus according to the embodiment of the present invention is registered in the domain of the content based on the domain ID inside the received package key information. To determine whether the external device 300 is registered in the domain or not, the controller 220 searches for a domain key of the domain separately stored in the external device 300.

At step S540, when the external device 300 includes the domain key, the controller 220 acquires the domain key, and at step S550, and the controller 220 extracts playback information from the package key. The controller 220 provides the extracted playback information and the encrypted content to the player 260. At step S560, the player 260 decrypts the encrypted content based on the received playback information and restores the content.

Meanwhile, when the external device 300 does not include the domain key as a result of search, the controller 220 checks whether the portable personal use authentication device 120 is connected or not at step S570. To this end, the controller 220 provides the package key and the package key information to the access controller 240 as well as operating the access controller 240.

At step S580, the access controller 240 checks whether the portable personal use authentication device 120 is connected or not. When the portable personal use authentication device 120 is in connection, at step S590, the access controller 240 acquires the domain key from the connected portable personal use authentication device 120. For this, the access controller 240 extracts the domain ID of the content from the received package key information, acquires the domain ID from the portable personal use authentication device 120, and compares the domain ID extracted from the content with the domain ID acquired from the portable personal use authentication device 120. When the two domain IDs are the same, the access controller 240 acquires the domain key from the portable personal use authentication device 120 at the step S590, and extracts the playback information from the package key by using the acquired domain key at the step S550. The access controller 240 provides the extracted playback information to the controller 220. The controller 220 provides the playback information and the encrypted content to the player 260, and the player 260 decrypts and plays the encrypted content based on the playback information.

Meanwhile, when the portable personal use authentication device 120 registered in the domain is not connected at the step S580, the access controller 240 sends the result to the controller 220, and the controller 220 informs the user that it cannot restore the content through the GUI 210 and terminates the operation.

The system and method of the present invention described above can secure personal use of contents supporting user authentication based on information a user has. With this system and method, a user can use the contents for his own purposes with no limitation in the physical location.

While the present invention has been described with respect to the specific embodiments, it will be apparent to those skilled in the art that various changes and modifications may be made without departing from the spirit and scope of the invention as defined in the following claims.

What is claimed is:

1. A contents personal use authentication apparatus, comprising:
   a packager configured to depackage contents into a package key, package key information, and an encrypted content;
   an access controller configured to read domain authentication information from a portable personal use authentication device storing the domain authentication information, and to extract domain information based on the package key information and playback information of a content based on the package key and the domain authentication information and; and
   a controller configured to receive the encrypted content from the packager and the playback information from the access controller, and send the encrypted content and the playback information to a player,
   wherein the domain authentication information includes a domain identification (ID) of the content, a domain key of the content, and a device ID of the portable personal use authentication device, and
   wherein the access controller includes:
   a domain authentication unit configured to extract the domain ID from the package key information;
   a safe region accessing unit configured to read in the domain authentication information stored in the portable personal use authentication device; and
   an authentication device control unit configured to provide the domain key included in the domain authentication information read by the safe region accessing unit to the domain authentication unit when the domain ID extracted in the domain authentication unit is the same as the domain ID included in the domain authentication information read by the safe region accessing unit,
   wherein the domain authentication unit extracts the playback information from the package key based on the domain key provided from the authentication device control unit.

2. The contents personal use authentication apparatus of claim 1, wherein the domain authentication information is read only in the contents personal use authentication apparatus.

3. The contents personal use authentication apparatus of claim 1, wherein the contents personal use authentication apparatus has a function of deleting the domain ID and the domain key.

4. The contents personal use authentication apparatus of claim 1, wherein the portable personal use authentication device stores a program for playing the content.

5. The contents personal use authentication apparatus of claim 1, wherein the portable personal use authentication device includes:
   a safe storage unit configured to store data that should be secured; and
   a general storage unit configured to store data accessible by a general operating system.

6. The contents personal use authentication apparatus of claim 5, wherein the data stored in the safe storage unit is accessible by an authorized application.

7. A method for authenticating personal use of contents by using a portable storage medium, comprising:
   reading domain authentication information from a portable personal use authentication device storing the domain authentication information;
   extracting playback information of a content provided to a contents personal use authentication apparatus based on the domain authentication information; and
   providing the playback information extracted in the contents personal use authentication apparatus to a player,
   wherein the domain authentication information includes a domain identification (ID) of the content, a domain key of the content, and a device ID of the portable personal use authentication device, and
   wherein said extracting playback information includes:
   depackaging the content into a package key, a package key information, and an encrypted content; and
   extracting domain information of the content from the package key information, and extracting the playback information of the content from the package key when the extracted domain information is the same as the domain indicated by the domain authentication information, and
   wherein said extracting playback information includes:
   extracting the domain ID from the package key information;
   reading the domain authentication information stored in the portable personal use authentication device;
   providing the domain key included in the domain authentication information; and
   extracting the playback information from the package key based on the domain key when the extracted domain ID is the same as the domain ID included in the domain authentication information.

8. The method of claim 7, wherein the domain authentication information is read by the contents personal use authentication apparatus.

9. The method of claim 7, wherein the domain authentication information includes a domain identification (ID) of the content, a domain key of the content, and a device ID of the portable personal use authentication device.

10. The method of claim 9, further comprising:
    deleting the domain ID and the domain key in the contents personal use authentication apparatus.

11. The method of claim 7, further comprising:
    playing the contents based on a program stored in the portable personal use authentication device.

* * * * *